Patented July 24, 1934

1,967,410

UNITED STATES PATENT OFFICE 1,967,410

CONTROL OF EXOTHERMIC REACTIONS

Gustav A. Kramer, Oakland, Calif., assignor to Shell Development Company, San Francisco, Calif., a corporation of Delaware No Drawing. Application July 14, 1931
Serial No. 550,810

28 Claims. (Cl. 260—99.12)

This invention relates to a process for the control of exothermic reactions of fluids within predetermined temperature limits and is more particularly concerned with a continuous cyclic process wherein reactants are introduced into a circulating mass large enough so that its large heat capacity will prevent a sudden and excessive temperature rise.

The invention will be described with reference to the treatment of secondary-base olefines (olefines capable of forming secondary alcohols upon hydration) with acids, whether or not the olefines are in the substantially pure state or in admixture with other hydrocarbons. The process is also applicable to the treatment of tertiary-base olefines (olefines capable of forming tertiary alcohols upon hydration) under similar conditions, the distinguishing difference being that the predetermined maximum reaction temperature of a tertiary-base olefine with an acid is lower than that of the corresponding secondary-base olefine with the same acid. Some other exothermic reactions which can be practiced by my process are the treatment of alcohols with acids to form esters, the circulating medium comprising alcohol, acid or the ester; the treatment of any base with any acid to form a salt, the circulating medium comprising the base, acid or the salt, or their solutions; the treatment of any olefine with an acid to form an ester, the circulating medium comprising the olefine, acid or ester, etc.

The origin of the olefines to be treated is not of importance and the olefines may be obtained from any suitable source, for instance, from natural gas as by cracking or from gases or products which are formed in distilling or cracking petroleum products, or may be derived from peat, coal, oil shales, and like carbonaceous natural materials. Also, the olefines may be obtained from the products which are formed by the destructive hydrogenation of carbonaceous materials, such as coal, brown coal, tar, coal tar, petroleum and petroleum products, and other carbonaceous materials which are suitable for treatment by destructive hydrogenation.

The difficulty in the esterification of olefines experienced by known processes is mainly the formation of polymers and/or other side reaction products. To avoid these, the known processes react their materials at much lower temperatures than is indicated by the stability of the reaction products. Thus, for instance, while secondary butyl hydrogen sulfate made from butylene in 80% sulfuric acid is stable at room temperatures, the reaction is carried out by prior processes at 0° C. or lower.

I have found that it is not necessary to apply this excessive refrigeration to the process, if conditions are so regulated that nowhere within the reacting media can the liberated heat of reaction raise the temperature beyond the limit determined for the particular case. Acids, as $H_2SO_4$ and $H_3PO_4$, can be used, and where $H_2SO_4$ is utilized its strength can vary from 80% to 100% $H_2SO_4$ at such high temperatures as would be prohibitive with known processes, although my invention can be practiced with less concentrated acids under correspondingly higher temperatures with similar advantages. By my method of control, I am able to obtain very high yields of esters with substantially no polymerization taking place.

I have determined that sudden and excessive temperature rise can be prevented in exothermic reactions of fluids, particularly of olefines with acids, if the heat of reaction be compensated for prior to the interaction of the reactants. This may be effected by precooling a circulating mass to an extent equal to the predetermined temperature rise due to the amount of heat to be liberated by the reaction of either one of the reactants in a circulating mass or by the reaction of both reactants in a circulating mass, in the latter situation, the circulating fluid being chemically inert with respect to both reactants whereas in the former, it is one of the reactants.

The principle of operation is as follows:

Where the circulating mass comprises one of the reactants, a sufficient volume of the same is circulated through a series of conduits wherein it is brought into contact with a relatively small quantity of reactant. Prior to the meeting of the two reactants, the circulating fluid is subcooled to an extent commensurate with the predetermined temperature rise due to the heat of reaction to be evolved according to the nature of the reaction and the quantity of the reactants. The amount of subcooling is slight, due to the comparatively large excess of circulating fluid which acts as a diluent. As part of the circulating medium reacts with the introduced reactant, the temperature rises until the reaction is completed. However, the temperature does not rise above the predetermined maximum reaction temperature (which varies with different reactants and with different concentrations of the same reactants) due to the fact that the temperature rise has been predetermined and compensated for by a prior cooling operation. Accordingly, the circulating medium flows at the most desirable temperature for the reaction and sudden and excessive temperature rises are avoided. The operation is repeated until the entire volume of circulating fluid has reacted and is subsequently chemically inert to the introduced reactant. When such is the case, a reactant of the character of the original circulating medium may be introduced into the diluent fluid at a point removed from the point of introduction of the first reactant and permitted to react with the latter while maintaining the predetermined temperature control. On the other hand, the reacted circulating fluid may be removed from the system, unreacted circulating fluid added to the system and the operation repeated. The reaction product is drawn off at a sufficient distance from the point of admixture of the two reactants so as to permit the reaction to go to completion. Where two reactants, other than the circulating mass, are introduced into the same, they are introduced at different stages into a sufficient volume of diluent fluid present in the circulating system so that only a slight degree of subcooling will be necessary below the predetermined maximum reaction temperature. The temperatures are controlled in the same manner as set out heretofore.

For illustrative purposes only, reference will be had to the treatment of a mineral oil fraction containing paraffin and olefine hydrocarbons of four carbon atoms to the molecule, from which tertiary-base olefines have been selectively removed, although it is to be understood that the process can be conducted with any olefine (such as ethylene, propylene, butylene, amylene, hexylene, etc.) or mineral oil fraction containing paraffin and olefine hydrocarbons of any number of carbon atoms to the molecule. With secondary-base olefines, it is desirable to conduct the process in the absence of tertiary-base olefines as the latter type of hydrocarbons are relatively very active and polymerize readily under the conditions of treatment most satisfactory for secondary-base olefines. It is desirable to execute the process in the liquid phase on account of the ease of quantitative control.

The hydrocarbon fraction essentially consisting of hydrocarbons containing four carbon atoms to the molecule is introduced by means of a pump or other suitable means into about ten times its volume of circulating medium present in the circulating system. In the present case, the circulating fluid comprises butylene hydrogen sulfate although it may comprise dibutyl sulfate or sulfuric acid. Butane or any of the other relatively inert paraffin hydrocarbons may or may not be present in the circulating fluid. The butyl hydrogen sulfate is circulated at a relatively high velocity to prevent the settling out of the heavier component, in this case, the sulfuric acid to be added, and to insure the thorough dispersion of the incoming reactant in the circulating medium. In the case under consideration of the treatment of olefines with acids, I have found that a good dispersion is secured and that the settling out of the acid is prevented with a circulating velocity of 5 to 8 ft./sec. Where the butyl hydrogen sulfate is circulated at 6 ft./sec. in a 2 inch pipe, I have found it satisfactory to introduce the butane-butene fraction at an equivalent velocity of 0.5 ft./sec. Before the butyl hydrogen sulfate is mixed with the mineral oil fraction, the former is cooled sufficiently below the predetermined maximum reaction temperature by passage through a cooling medium, so as to about compensate for any rise in temperature when the secondary base olefine, dispersed in the relatively large volume of diluent liquid, is contacted with the sulfuric acid at a later stage. The cooling of the circulating medium may take place after the butane-butene fraction has been added but prior to the introduction of acid. Since the volume and specific heat of the circulating mass are known as are the heat of reaction and predetermined maximum reaction temperature, the degree of subcooling necessary to compensate for the heat of reaction can be calculated. The mixture or dispersion is then reacted with $H_2SO_4$ at a further point in the circulating system. Due to the relatively large heat capacity of the diluent liquid per molecule of reactants, the temperature rise is very small—about 5° F. with 80% $H_2SO_4$ introduced at an equivalent velocity of 0.12 ft./sec. Since the desirable maximum reaction temperature of butene with 80% $H_2SO_4$ is about 85° F., whereas with 93% $H_2SO_4$ it is about 60° F., the circulating butyl hydrogen sulfate has to be cooled before contact with the butane-butene fraction to about 80° F. Consequently, the increase in temperature due to the exothermic reaction of the $H_2SO_4$ with butylene in a relatively large volume of inert diluent liquid does not cause a sudden and excessive rise in temperature, neither does it cause the temperature to mount above the predetermined maximum reaction temperature, i. e., 85° F. and polymerization of butylene is substantially avoided with an almost negligible degree of subcooling.

For example, if in the above reaction, 95,000 B. t. u./hr. or 26.4 B. t. u./sec. must be removed and at the given velocity, one gallon of butyl hydrogen sulfate or 11 lbs. passes a given point per second, each gallon of butyl hydrogen sulfate must remove 26.4 B. t. u./sec. The specific heat of the butyl hydrogen sulfate being about 0.5 B. t. u./lbs., one gallon takes up about 5.5 B. t. u./sec. per degree temperature rise and consequently will take up the required 26.4 B. t. u./sec. with a temperature rise of about 5° F. This then is the degree of subcooling required. The reaction product or butyl hydrogen sulfate is drawn off at a sufficient distance from the point of admixture of the two reactants so as to permit the reaction to go to completion.

In the foregoing example, the maximum ratio of inert circulating medium to reactants was about 9:1 so that the temperature rise due to the reaction is only $\frac{1}{10}$ of that which would occur without the inert medium. If it were desired to keep the temperature rise in the foregoing example to 2° F., the maximum ratio of inert fluid to the reactants would have to be about 24:1; and with a temperature rise of only 1° F., the maximum ratio of inert fluid to the reactants would have to be about 49:1.

When employing 90% to 100% $H_2SO_4$ with normal butylene, it is desirable to react the two in an inert mass of large heat capacity precooled to a temperature between about 40° to 60° F. so that the end temperature does not exceed about 60° F., as that temperature is approximately the desirable reaction temperature of butylene and 90% to 100% $H_2SO_4$.

In the case where a paraffin hydrocarbon, as butane, has acccompanied the introduction of the olefine, as butylene, into the inert circulating medium, the paraffin hydrocarbon is removed with the ester formed and separated therefrom in a separatory vessel as the butane is immiscible with the ester formed, the mixture stratifying upon standing. Any polymer formed remains with the butane. Instead of butyl hydrogen sulfate, the circulating medium in the above example may be dibutyl or dialkyl sulfate, as the process can be adjusted to produce either neutral or acid esters by varying the molal proportions of the reactants.

The circulating fluid may also serve to carry a catalyst in solution or suspension to expedite the rate of reaction.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results obtained. On the other hand, the invention is to be regarded as limited only by the terms of the accompanyng claims, in which it is my intention to claim all novelty inherent therein as broadly as is possible in view of the prior art.

I claim as my invention:

1. The process of conducting exothermic reactions of olefines with acids comprising: reacting an olefine with an acid in a circulating mass of large heat capacity precooled to a temperature below the maximum reaction temperature at which the reaction product is stable so that the end temperature does not exceed said maximum in the absence of further substantial refrigeration.

2. The process of conducting exothermic reactions of olefines with acids comprising: reacting an olefine with an acid in a circulating mass of large heat capacity precooled to a temperature below the maximum reaction temperature at which the reaction product is stable so that the end temperature approximates said maximum in the absence of further substantial refrigeration.

3. The process of conducting exothermic reactions of fluids comprising: introducing a relatively small quantity of olefine into a relatively large quantity of circulating fluid, contacting the mixture with a mineral acid reactant at a temperature below the maximum reaction temperature at which the reaction product is stable so that the end temperature will approximate said maximum in the absence of further substantial refrigeration and withdrawing the reaction product from circulation.

4. The process of conducting exothermic reactions of fluids comprising: introducing a relatively small quantity of olefine into a relatively large quantity of circulating fluid which has been cooled to a temperature sufficiently low to compensate for the temperature rise due to the heat of reaction evolved when the mixture is contacted with a mineral acid reactant, reacting the olefine with said reactant in the absence of further substantial refrigeration and withdrawing the reaction product from circulation.

5. The process of conducting exothermic reactions of olefines with acids comprising: continuously circulating a circulating medium in a fluid system, subcooling the circulating medium to a temperature sufficiently low to compensate for the temperature rise due to the heat of reaction evolved due to a subsequent exothermic reaction, dispersing an olefine in the precooled circulating fluid, reacting the olefine with an acid in the absence of further substantial refrigeration and continuously withdrawing the reaction product while continuing the cycle.

6. The process of conducting exothermic reactions of olefines with acids comprisings: continuously circulating a reaction product of an olefine and an acid in a fluid system, subcooling the circulating medium to a temperature sufficiently low to compensate for the temperature rise due to the heat of reaction evolved between the constituents of the reaction product, dispersing the olefine in the precooled circulating fluid, reacting the olefine with an acid which forms the acidic portion of the reaction product in the absence of further substantial refrigeration and continuously withdrawing the reaction product while continuing the cycle.

7. The process of conducting exothermic reactions of olefines with acids comprising: reacting a secondary-base olefine with an acid in a circulating mass of large heat capacity precooled to a temperature below the maximum reaction temperature at which the reaction product is stable so that the end temperature does not exceed said maximum in the absence of further substantial refrigeration.

8. The process of conducting exothermic reactions of olefines with acids comprising: reacting a secondary-base olefine with an acid in a circulating mass of large heat capacity precooled to a temperature below the maximum reaction temperature at which the reaction product is stable so that the end temperature approximates said maximum in the absence of further substantial refrigeration.

9. The process of conducting exothermic reactions of fluids comprising: introducing a relatively small quantity of secondary-base olefine into a relatively large quantity of circulating fluid, contacting the mixture with a mineral acid reactant at a temperature below the maximum reaction temperature at which the reaction product is stable so that the end temperature will approximate said maximum in the absence of further substantial refrigeration and withdrawing the reaction product from circulation.

10. The process of conducting exothermic reactions of fluids comprising: introducing a relatively small quantity of secondary-base olefine into a relatively large quantity of circulating fluid which has been cooled to a temperature sufficiently low to compensate for the temperature rise due to the heat of reaction evolved when the mixture is contacted with a mineral acid reactant, reacting the secondary-base olefine with said mineral acid reactant in the absence of further substantial refrigeration and withdrawing the reaction product from circulation.

11. The process of conducting exothermic reactions of olefines with acids comprising: continuously circulating a circulating medium in a fluid system, subcooling the circulating medium to a temperature sufficiently low to compensate for the temperature rise due to the heat of reaction evolved due to a subsequent exothermic reaction, dispersing a secondary-base olefine in the precooled circulating fluid, reacting the secondary-base olefine with an acid in the absence of further substantial refrigeration and continuously withdrawing the reaction product while continuing the cycle.

12. The process of conducting exothermic reactions of fluids comprising: continuously circulating a reaction product of secondary-base olefine and a mineral acid in a fluid system, subcooling the circulating medium to a temperature sufficiently low to compensate for the temperature rise due to the heat of reaction evolved between the constituents of the reaction product, dispersing the secondary-base olefine in the precooled circulating fluid, reacting the secondary-base olefine with a mineral acid which forms the acidic portion of the reaction product in the absence of further substantial refrigeration and continuously withdrawing the reaction product while continuing the cycle.

13. The process of conducting exothermic reactions of fluids comprising: reacting a secondary base olefine with $H_2SO_4$ in a circulating mass of large heat capacity precooled to a temperature below the maximum reaction temperature at which the reaction product is stable so that the end temperature does not exceed said maximum in the absence of further substantial refrigeration.

14. The process of conducting exothermic reactions of fluids comprising: reacting a secondary-base olefine with $H_2SO_4$ in a circulating mass of large heat capacity precooled to a temperature below the maximum reaction temperature at which the reaction product is stable so that the end temperature approximates said maximum in the absence of further substantial refrigeration.

15. The process of conducting exothermic reactions of fluids comprising: introducing a relatively small quantity of secondary-base olefine into a relatively large quantity of circulating fluid, contacting the mixture with $H_2SO_4$ at a temperature below the maximum reaction temperature at which the reaction product is stable so that the end temperature will approximate said maximum in the absence of further substantial refrigeration and withdrawing the reaction product from circulation.

16. The process of conducting exothermic reactions of fluids comprising: introducing a relatively small quantity of secondary-base olefine into a relatively large quantity of circulating fluid which has been cooled to a temperature sufficiently low to compensate for the temperature rise due to the heat of reaction evolved when the mixture is contacted with $H_2SO_4$, reacting the secondary-base olefine with $H_2SO_4$ in the absence of further substantial refrigeration and withdrawing the reaction product from circulation.

17. The process of conducting exothermic reactions of fluids comprising: continuously circulating a circulating medium in a fluid system, subcooling the circulating medium to a temperature sufficiently low to compensate for the temperature rise due to the heat of reaction evolved due to a subsequent exothermic reaction, dispersing a secondary-base olefine in the precooled circulating fluid, reacting the secondary-base olefine with $H_2SO_4$ in the absence of further substantial refrigeration and continuously withdrawing the reaction product while continuing the cycle.

18. The process of conducting exothermic reactions of fluids comprising: continuously circulating a reaction product of a secondary-base olefine and $H_2SO_4$ in a fluid system, subcooling the circulating medium to a temperature sufficiently low to compensate for the temperature rise due to the heat of reaction evolved between the constituents of the reaction product, dispersing the secondary-base olefine in the precooled circulating fluid, reacting the secondary-base olefine with $H_2SO_4$ in the absence of further substantial refrigeration and continuously withdrawing the reaction product while continuing the cycle.

19. The process of conducting exothermic reactions of olefines with acids comprising: reacting a mineral oil fraction containing the desired olefine or olefines with an acid in a circulating mass of large heat capacity precooled to a temperature below a maximum reaction temperature at which the reaction product is stable so that the end temperature does not exceed said maximum in the absence of further substantial refrigeration.

20. The process of conducting exothermic reactions of fluids comprising: reacting a mineral oil fraction containing the desired olefine or olefines with a mineral acid in a circulating mass of large heat capacity precooled to a temperature below a maximum reaction temperature at which the reaction product is stable so that the end temperature approximates said maximum in the absence of further substantial refrigeration.

21. The process of conducting exothermic reactions of fluids comprising: reacting normal butylene with $H_2SO_4$ of not less than 90% strength in a circulating mass of large heat capacity precooled to a temperature between about 40° to 60° F. so that the end temperature does not exceed about 60° F. in the absence of further substantial refrigeration.

22. The process of conducting exothermic reactions of fluids at temperatures at which their reaction products are stable without excessive refrigeration, comprising: reacting an olefine with a mineral acid reactant in a circulating mass of large heat capacity pre-cooled to an extent substantially equal to the calculated temperature rise due to the amount of heat to be liberated by the reaction so that the end temperature does not exceed said optimum temperature in the absence of further substantial refrigeration.

23. The process of conducting exothermic reactions of fluids at temperatures at which their reaction products are stable without excessive refrigeration, comprising: reacting an olefine with a mineral acid reactant in a circulating mass of large heat capacity precooled to an extent substantially equal to the calculated temperature rise due to the amount of heat to be liberated by the reaction so that the end temperature approximates said optimum temperature in the absence of further substantial refrigeration.

24. The process of sulfating olefines which comprises reacting an olefine with sulfuric acid in a circulating mass of acid liquor precooled to an extent substantially equal to the calculated temperature rise due to the amount of heat to be liberated by the reaction so that the end temperature approximates a maximum reaction temperature at which the reaction product is stable, in the absence of further substantial refrigeration.

25. The process of sulfating olefines which comprises reacting secondary olefines, from which tertiary olefines have been selectively removed, with sulfuric acid in a circulating mass of acid liquor precooled to an extent substantially equal to the calculated temperature rise due to the amount of heat liberated by the reaction so that the end temperature approximates a maximum reaction temperature at which the reaction product is stable, in the absence of further substantial refrigeration.

26. The process of sulfating secondary olefines containing at least four carbon atoms to the molecule, from which tertiary olefines have been selectively removed, which comprises reacting said secondary olefines with 80 to 100% $H_2SO_4$ in a circulating mass of olefines absorbed in sulfuric acid which has been subcooled to an extent commensurate with the calculated temperature rise due to the heat of reaction to be evolved, in the absence of further substantial refrigeration.

27. The process of sulfating a hydrocarbon fraction consisting predominantly of hydrocarbons containing the same number of carbon atoms to the molecule and which contains secondary olefines but substantially no tertiary olefines, which comprises reacting said hydrocarbon fraction with sulfuric acid in a circulating mass of olefines absorbed in sulfuric acid which has been subcooled to an extent commensurate with the calculated temperature rise due to the heat of reaction to be evolved, in the absence of further substantial refrigeration.

28. The process of sulfating a hydrocarbon fraction consisting predominantly of hydrocarbons containing the same number of carbon atoms to the molecule and which contains secondary olefines but substantially no tertiary olefines, which comprises reacting said hydrocarbon fraction with sulfuric acid in a circulating mass of corresponding olefines absorbed in sulfuric acid which has been subcooled to an extent commensurate with the calculated temperature rise due to the heat of reaction to be evolved, in the absence of further substantial refrigeration.

GUSTAV A. KRAMER.